US008101698B2

(12) United States Patent
Lai

(10) Patent No.: US 8,101,698 B2
(45) Date of Patent: Jan. 24, 2012

(54) SURFACE ACTIVE PREPOLYMERS WITH BOTH FLUORINE-CONTAINING GROUPS AND HYDROPHILIC GROUPS

(75) Inventor: Yu-Chin Lai, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 13/072,162

(22) Filed: Mar. 25, 2011

(65) Prior Publication Data

US 2011/0172374 A1    Jul. 14, 2011

Related U.S. Application Data

(62) Division of application No. 11/772,939, filed on Jul. 3, 2007, now Pat. No. 7,935,770.

(51) Int. Cl.
C08F 12/20 (2006.01)
C08F 12/30 (2006.01)

(52) U.S. Cl. ........... 526/243; 526/247
(58) Field of Classification Search .......... 526/243, 526/247
See application file for complete search history.

(56) References Cited

U.S. PATENT DOCUMENTS

| 3,408,429 A | 10/1968 | Wichterle |
| 3,496,254 A | 2/1970 | Wichterle |
| 4,084,459 A | 4/1978 | Clark |
| 4,136,250 A | 1/1979 | Mueller et al. |
| 4,153,641 A | 5/1979 | Deichert et al. |
| 4,192,827 A | 3/1980 | Mueller et al. |
| 4,197,266 A | 4/1980 | Clark et al. |
| 4,486,577 A | 12/1984 | Mueller et al. |
| 4,605,712 A | 8/1986 | Mueller et al. |
| 4,740,533 A | 4/1988 | Su et al. |
| 4,910,277 A | 3/1990 | Bambury et al. |
| 4,954,587 A | 9/1990 | Mueller |
| 5,034,461 A | 7/1991 | Lai et al. |
| 5,070,215 A | 12/1991 | Bambury et al. |
| 5,260,000 A | 11/1993 | Nandu et al. |
| 5,271,875 A | 12/1993 | Appleton et al. |
| 5,310,779 A | 5/1994 | Lai |
| 5,358,995 A | 10/1994 | Lai et al. |
| 5,374,662 A | 12/1994 | Lai |
| 5,420,324 A | 5/1995 | Lai et al. |
| 5,496,871 A | 3/1996 | Lai |
| 7,176,268 B2 * | 2/2007 | Lai et al. ............ 528/26 |
| 7,411,029 B2 * | 8/2008 | Lai et al. ............ 528/32 |
| 7,482,416 B2 * | 1/2009 | Lai et al. ............ 526/279 |

OTHER PUBLICATIONS

International Search Report (PCT/ISA/220) and Written Opinion (PCT/ISA/237) mailed on Oct. 24, 2008.

* cited by examiner

Primary Examiner — Robert D. Harlan
(74) Attorney, Agent, or Firm — Glenn D. Smith

(57) ABSTRACT

Provided are surface modified contact lenses formed from one or more fumaric-or itaconic-containing prepolymers having polymerizable functionality that is complimentary to polymerizable hydrophilic polymers.

19 Claims, No Drawings

SURFACE ACTIVE PREPOLYMERS WITH BOTH FLUORINE-CONTAINING GROUPS AND HYDROPHILIC GROUPS

CROSS-REFERENCE TO RELATED APPLICATIONS

This application is a divisional of application Ser. No. 11/772,939, filed Jul. 3, 2007 now U.S. Pat. No. 7,935,770.

FIELD OF THE INVENTION

The present invention relates generally to polymerizable fumaric- and maleic-containing prepolymers with both fluoroether and hydrophilic groups as well as compositions comprising the prepolymers that are used in the manufacture of medical devices. More specifically, the present invention relates to contact lenses formed from one or more fluorinated fumaric- or maleic-containing prepolymers.

BACKGROUND OF THE INVENTION

Medical devices such as ophthalmic lenses made from silicone materials have been investigated for a number of years. Such materials can generally be sub-divided into two major classes, namely hydrogels and non-hydrogels. Non-hydrogels do not absorb appreciable amounts of water, whereas hydrogels can absorb and retain water in an equilibrium state. Hydrogels generally have water content between about 15 to about 80 weight percent. Regardless of their water content, both non-hydrogel and hydrogel silicone medical devices tend to have relatively hydrophobic, non-wettable surfaces that have a high affinity for lipids. This problem is of particular concern with contact lenses.

Polyfumarate prepolymers and compositions comprising the prepolymers have been developed to make highly oxygen permeable hydrogels which may be used to make biomedical devices including contact lenses. Examples of these fumarate and fumaramide prepolymers and compositions containing the prepolymers can be found in U.S. Pat. Nos. 5,374,662 and 5,496,871, the contents of each being incorporated by reference herein. Because of the polar character of amide functionality, this class of monomer shows good compatibility with both hydrophobic monomers such as tris(trimethylsiloxy)silane (TRIS) and hydrophilic monomers such as N,N-dimethylacrylamide (DMA). These prior art prepolymers provide silicone hydrogels with excellent oxygen permeability and mechanical properties. However, like other silicone hydrogels, they are not wettable enough to be useful as continuous wear lenses unless the surface is treated. Therefore there is a need for new prepolymers that do not have the limitations of prior art prepolymers

SUMMARY OF THE INVENTION

In this invention, polymerizable fluorinated monomers with both fluoroether and hydrophilic groups are disclosed. Namely, the prepolymers have one of the following two structures:

$$YCO-CH=CHCOXOCCH=CH-COY \quad (I)$$

and $$CH_2=C(CH_2COY)-COXOC(CH_2COY)C=CH_2 \quad (II)$$

wherein Y is a group derived from a reactive oligomer of hydrophilic monomers such as those hydrophilic oligomers containing an OH or amino group or a group containing acid functionality and X is derived from a reactive fluoroether. The surface active prepolymers disclosed herein are surface active and can be used to deliver surface wetability to silicone containing compositions. The surface active prepolymers, when part of a silicone containing medical device composition, will help to improve device performance, for example, by decreasing lipid depositions.

The hydrophilic oligomer can be those derived from hydrophilic monomers such as N-Vinyl pyrrolidinone (NVP), N,N-dimethylacrylamide (DMA), Glycerol methacrylate (GMA), etc.

This reactive hydrophilic oligomer, which is Y, can have the following structure:

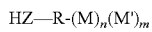

Wherein Z is O or NR, R' is an alkyl group of C1 to C10, R is a spacer group or bond and M and M' are the same or different hydrophilic monomers with m+n is at least 3 and X is a derivative of $HO[(CP_2)_aO]_bH$ with a=2, 3 or 4 and b is at least 5.

One example of the reactive hydrophilic oligomer can be prepared according to the following equation:

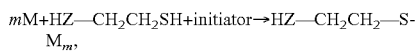

wherein M is a hydrophilic monomer or comonomer, m is an integer between 2 and 50 and Z is O or NR, W is an alkyl group of C1 to C10.

The reactive hydrophilic oligomer (Y) preferably has a molecular weight (number average) Mn 500 to 15,000, more preferably 500-4,000, most preferably 1,000-1,500.

The reactive ether can be a hydroxy terminated perfluoroether such as polytetrafluoroethylene glycol. One example of a perfluoroether is Zi-dol. The prepolymer claimed in this invention can be prepared by first reacting fumaryl chloride with polytetrafluoroethylene glycol in a 2:1 molar ratio to give acid-chloride capped fumarate prepolymer of polyperfluoroether. The prepolymer is then reacted with hydroxy- or amino-containing reactive hydrophilic oligomer to give a prepolymer having the structure of formula (I) or (II).

The weight ratio of the hydrophobic fluoroether portion to the hydrophilic portion can range from 10 to 90%.

The prepolymer is surface active. It is known that fluoro species can help resist protein and lipid deposits for a medical device such as a contact lens. When present near the surface, the prepolymer of this invention can affect surface wettability which makes this class of prepolymer useful for changing surface characteristics of a medical device such as a contact lens.

The monomers of the invention herein can be prepared using either the commercially available acid chloride or anhydride as the starting compound and reacting the starting material first with a fluorine-containing alcohol then reacting with water or polymerizable hydrophilic oligomer. The final monomer can be a single compound or a mixture of compounds, depending on the polymerizable oligomers used, or reactants (acid chloride or anhydride) used in the synthetic procedure.

The invention is further directed toward medical devices formed of a polymerizable mix comprising the polymerizable fumaric- and maleic-containing prepolymers with both fluoroether and hydrophilic groups. Such devices are useful in forming surface modified medical devices without use of treatments such as plasma treatment or corona discharge treatment.

BRIEF DESCRIPTION OF THE DRAWINGS

None

DETAILED DESCRIPTION OF THE INVENTION

In this invention, polymerizable fluorinated monomers with both fluoroether and hydrophilic groups are disclosed. Namely, the prepolymers have one of the following two structures:

$$YCO-CH=CHCOXOCCH=CH-COY \quad (I)$$

and $$CH_2=C(CH_2COY)-COXOC(CH_2COY)C=CH_2 \quad (II)$$

wherein Y is a group derived from a reactive oligomer of hydrophilic monomers such as those hydrophilic oligomers containing an OH or amino group or a group containing acid functionality and X is derived from a reactive fluoroether. The surface active prepolymers disclosed herein are surface active and can be used to deliver surface wetability to silicone containing compositions. The surface active prepolymers, when part of a silicone containing medical device composition, will help to improve device performance, for example, by decreasing lipid depositions.

The reactive hydrophilic oligomer can be derived from hydrophilic monomers such as NVP, DMA, GMA, etc.

This reactive hydrophilic oligomer, which is Y, can have the following structure:

$$HZ-R-(M)_n(M')_m$$

Wherein Z is O or NR', R' is an alkyl group of C1 to C10, R is a spacer group or bond and M and M' are the same or different hydrophilic monomers with m+n is at least 3 and X is a derivative of $HO[(CF_2)_aO]_bH$ with a=2, 3 or 4 and b is at least 5.

One example of the reactive hydrophilic oligomer can be prepared according to the following equation:

$$mM+HZ-CH_2CH_2SH+initiator \rightarrow HZ-CH_2CH_2-S-M_m$$

wherein M is a hydrophilic monomer or comonomer, m is an integer between 2 and 50 and Z is O or NR', R' is an alkyl group of C1 to C10.

The reactive hydrophilic oligomer (Y) preferably has a molecular weight (number average) Mn 500 to 5,000, more preferably 500-4,000, most preferably 1,000-1,500.

The reactive ether can be a hydroxy terminated perfluoroether such as polytetrafluoroethylene glycol. One example of a perfluoroether is Zi-dol. The prepolymer claimed in this invention can be prepared by first reacting fumaryl chloride with polytetrafluoroethylene glycol in a 2:1 molar ratio to give acid-chloride capped fumarate prepolymer of polyperfluoroether. The prepolymer is then reacted with hydroxy- or amino-containing reactive hydrophilic oligomer to give a prepolymer having the structure of formula (I) or (II).

The prepolymer is especially useful for use with copolymerizable polymeric systems used for biomedical devices, especially contact lenses. In further embodiments of the present invention, the prepolymers are used to make biomedical devices and are useful in contact lens formulations which may be either "soft" or "hard" and which may preferably be hydrogels.

The polymerizable monomers with both fluoroether and hydrophilic groups of the present invention (prepolymers) can be used in device forming monomer mixtures. Monomer mixes comprising the prepolymers of the present invention may comprise at least one additional hydrophilic monomer. The monomer mixes may further comprise at least one silicone monomer. Further, the monomer mix may additionally comprise both thermal- and photoinitiators for curing purposes.

As is known in the field, certain crosslinked polymeric materials may be polymerized to form a hard, water-free, xerogel. Xerogels are understood to be unhydrated hydrogel formulations. It was found that such xerogels could be physically altered to, for example, impart optical properties through machining, and then be hydrated and retain their water content.

When the term "polymerization" is used herein we refer to the polymerization of the double bonds of the monomers and prepolymers end capped with polymerizable unsaturated groups which results in a crosslinked three-dimensional network.

Further, notations such as "(meth)acrylate" or "(meth)acrylamide" are used herein to denote optional methyl substitution. Thus, for example, (meth)acrylate includes both acrylate and methacrylate and N-alkyl-(meth)acrylamide includes both N-alkyl acrylamide and N-alkyl methacrylamide.

The term "prepolymer" denotes a high molecular weight monomer containing polymerizable groups. The monomers added to the monomeric mixture of the present invention may therefore be low molecular weight monomers or prepolymers. Thus, it is understood that a term such as "silicone monomers" includes "silicone prepolymers".

The terms "shaped articles for use in biomedical applications" or "biomedical devices or materials" or "biocompatible materials" mean the hydrogel materials disclosed herein have physicochemical properties rendering them suitable for prolonged contact with living tissue, blood and the mucous membranes.

While the present invention contemplates the use of polymerizable fluorinated monomers with both fluoroether and hydrophilic groups for medical devices including both "hard" and "soft" contact lenses, the formulations containing the polymerizable fluorinated monomers with both fluoroether and hydrophilic groups of the present invention are thought to be especially useful as soft hydrogel contact lenses. As is understood in the field, a lens is considered to be "soft" if it can be folded back upon itself without breaking.

A hydrogel is a hydrated cross-linked polymeric system that contains water in an equilibrium state. Silicone hydrogels (i.e., hydrogels containing silicone) are usually prepared by polymerizing a mixture containing at least one silicone monomer and at least one hydrophilic monomer. By the term silicone, it is meant that the material is an organic polymer comprising at least five percent by weight silicone (—OSi— linkages), preferably 10 to 100 percent by weight silicone, more preferably 30 to 90 percent by weight silicone. Applicable silicone monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

The polymerizable monomers with both fluoroether and hydrophilic groups of the present invention are prepared according to syntheses well known in the art and according to the examples disclosed herein. The polymerizable monomers with both fluoroether and hydrophilic groups of the present invention are incorporated into the monomer mix. The relative weight % of the polymerizable monomers with both fluoroether and hydrophilic groups as compared to the total monomer mix weight % is from about 0.1% to 20%, more preferably from about 0.25% to 10%, and most preferably 0.5% to 5%.

Examples of hydrophilic monomers include, but are not limited to, ethylenically unsaturated lactam-containing monomers such as N-vinyl pyrrolidinone; methacrylic and acrylic acids; (meth)acrylic substituted alcohols, such as 2-hydroxyethylmethacrylate (HEMA) and 2-hydroxyethylacrylate; and (meth)acrylamides, such as methacrylamide and N,N-dimethylacrylamide (DMA); vinyl carbonate or vinyl carbamate monomers such as disclosed in U.S. Pat. No. 5,070,215; and oxazolinone monomers such as disclosed in U.S. Pat. No. 4,910,277. Other hydrophilic monomers such as glycerol methacrylate and polyethyleneglycol monomethacrylate are also useful in the present invention.

Preferred hydrophilic vinyl-containing monomers that may be incorporated into the hydrogels of the present invention include monomers such as N-vinyl lactams such as N-vinyl pyrrolidinone (NVP), N-vinyl-N-methyl acetamide, N-vinyl-N-ethyl acetamide, N-vinyl-N-ethyl formamide, N-vinyl formamide, with NVP being the most preferred.

Preferred hydrophilic acrylic-containing monomers which may be incorporated into the hydrogel of the present invention include hydrophilic monomers such as N,N-dimethyl acrylamide (DMA), 2-hydroxyethyl methacrylate, glycerol methacrylate, 2-hydroxyethyl methacrylamide, methacrylic acid and acrylic acid, with DMA being the most preferred. Other suitable hydrophilic monomers will be apparent to one skilled in the art. The relative weight % of hydrophilic monomer(s) to total weight % of the comonomer mix is preferably from about 5% to 80%, more preferably from about 20% to 70%, and most preferably 20% to 40%.

As mentioned previously, additional silicone monomers may be present in the monomer mixes with the polymerizable fluorinated monomers with both fluoroether and hydrophilic groups of the present invention. One preferred class of suitable silicone monomers which may be incorporated into a monomer mix with the polymerizable fluorinated monomers with both fluoroether and hydrophilic groups of the present invention are the bulky polysiloxanylalkyl (meth)acrylic monomers represented by the following Formula (III):

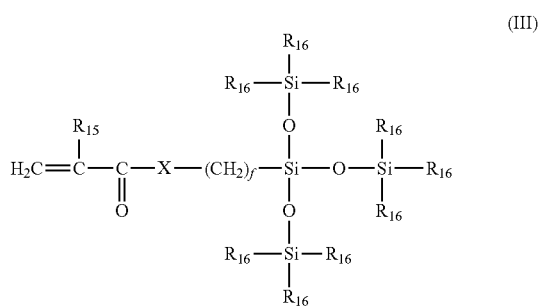

wherein: X is O or NR; R is an alkyl group having 1 to 10 carbon atoms; each $R_{15}$ is independently hydrogen or an alkyl group having 1 to 10 carbon atoms; each $R_{16}$ is independently a lower alkyl having 1 to 6 carbon atoms or phenyl group; and f is 1 or 3 to 10.

Such bulky monomers include methacryloxypropyl tris(trimethylsiloxy)silane (TRIS), pentamethyldisiloxanylmethylmethacrylate, tris(trimethylsiloxy)methacryloxy propylsilane, phenyltetramethyldisiloxanylethyl acrylate, and methyldi(trimethylsiloxy)methacryloxymethyl silane. Further preferred classes of silicone monomers which may be incorporated into a monomer mix with the polymerizable fluorinated monomers with both fluoroether and hydrophilic groups of the present invention are the poly(organosiloxane) monomers represented by the following formula (IV):

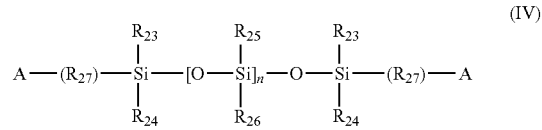

wherein: A is an activated unsaturated group, such as an ester or amide of an acrylic or a methacrylic acid; each $R_{23}$-$R_{26}$ is independently selected from the group consisting of a monovalent hydrocarbon radical or a halogen substituted monovalent hydrocarbon radical having 1 to 18 carbon atoms which may have ether linkages between carbon atoms; $R_{27}$ is a divalent hydrocarbon radical having from 1 to 22 carbon atoms; and n is 0 or an integer greater than or equal to 1. When siloxane-containing monomers other than the bulky silicone prepolymers are incorporated into the monomer mix, the weight % of the other siloxane-containing monomers as compared to the total monomer mix weight % is from about 5% to 60%, more preferably from about 10% to 50%, and most preferably 10% to 40%.

Either the silicone monomer, the polymerizable monomers with both fluoroether and hydrophilic groups, or the hydrophilic monomer may function as a crosslinking agent (a crosslinker), being defined as a monomer having multiple polymerizable functionalities. Additional crosslinkers also may be present in the monomer mix which polymerizes to form the hydrogel.

Most "known" crosslinking agents are hydrophobic. When it is desirable for both an acrylic-containing monomer and a vinyl-containing monomer to be incorporated into the silicone polymer of the present invention, a further crosslinking agent having both a vinyl and an acrylic polymerizable group may be used, since these vinyl and acrylic monomers have differing reactivity ratios and may not copolymerize efficiently. Such crosslinkers which facilitate the copolymerization of these monomers are the subject of U.S. Pat. No. 5,310,779, the content of which is incorporated herein by reference. Such crosslinkers are represented by the following schematic representation:

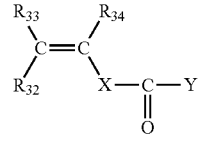

wherein V denotes a vinyl-containing group having the formula:

A denotes an acrylic-containing group having the formula:

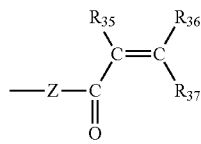

and S denotes a styrene-containing group having the formula:

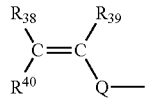

wherein $R_{31}$ is an alkyl radical derived from substituted and unsubstituted hydrocarbons, polyalkylene oxide, poly(perfluoro) alkylene oxide, dialkyl-capped polydimethylsiloxane, dialkyl-capped polydimethylsiloxane modified with fluoroalkyl or fluoroether groups; $R_{32}$-$R_{40}$ are independently H, or alkyl of 1 to 5 carbon atoms; Q is an organic group containing aromatic moieties having 6-30 carbon atoms; X, Y, and Z are independently O, NH or S; v is 1, or higher; and a and s are independently greater than or equal to 0; and a+s is greater than or equal to 1. An example is 2-hydroxyethyl-methacrylate vinyl carbonate or carbamate.

Other crosslinking agents which may be incorporated into the silicone hydrogel of the present invention include polyvinyl, typically di- or tri-vinyl monomers, most commonly the di- or tri(meth)acrylates of dihydric ethylene glycol, triethylene glycol, butylene glycol, hexane-1,6-diol, thio-diethylene glycol-diacrylate and methacrylate; neopentyl glycol diacrylate; trimethylolpropane triacrylate and the like; N,N'-dihydroxyethylene-bisacrylamide and -bismethacrylamides; also diallyl compounds like diallyl phthalate and triallyl cyanurate; divinylbenzene; ethylene glycol divinyl ether; and the (meth)acrylate esters of polyols such as triethanolamine, glycerol, pentaerythritol, butylene glycol, mannitol, and sorbitol. Further examples include N,N-methylene-bis-(meth)acrylamide, sulfonated divinylbenzene, and divinylsulfone. Also useful are the reaction products of hydroxyalkyl (meth)acrylates with unsaturated isocyanates, for example the reaction product of 2-hydroxyethyl methacrylate with 2-isocyanatoethyl methacrylate (IEM). See U.S. Pat. No. 4,954,587.

Other known crosslinking agents are polyether-bisurethane-dimethacrylates (see U.S. Pat. No. 4,192,827), and those crosslinkers obtained by reaction of polyethylene glycol, polypropylene glycol and polytetramethylene glycol with 2-isocyanatoethyl methacrylate (IEM) or m-isopropenyl-γ,γ-dimethylbenzyl isocyanates (m-TMI), and polysiloxane-bisurethane-dimethacrylates. See U.S. Pat. Nos. 4,486,577 and 4,605,712. Still other known crosslinking agents are the reaction products of polyvinyl alcohol, ethoxylated polyvinyl alcohol or of polyvinyl alcohol-co-ethylene with 0.1 to 10 mol % vinyl isocyanates like IEM or m-TMI.

The prepolymers of the present invention, when copolymerized, are readily cured to cast shapes by methods such as UV polymerization, use of free radical thermal initiators and heat, or combinations thereof. Representative free radical thermal polymerization initiators are organic peroxides, such as for example acetyl peroxide, lauroyl peroxide, decanoyl peroxide, stearoyl peroxide, benzoyl peroxide, tertiary butyl peroxypivalate, peroxydicarbonate, and the commercially available thermal initiators such as LUPERSOL" 256, 225 (Atofina Chemical, Philadelphia, Pa.) and the like, employed in a concentration of about 0.01 to 2 percent by weight of the total monomer mixture. Representative UV initiators are those known in the field such as, benzoin methyl ether, benzoin ethyl ether, DAROCUR®-1173, 1164, 2273, 1116, 2959, 3331, IGRACURE® 651 and 184 (Ciba Specialty Chemicals, Ardsley, N.Y.).

In addition to the above-mentioned polymerization initiators, the copolymer of the present invention may also include other components as will be apparent to one skilled in the art. For example, the monomer mix may include additional colorants, or UV-absorbing agents and toughening agents such as those known in the contact lens art.

The resulting copolymers of this invention can be formed into contact lenses by the spincasting processes such as those disclosed in U.S. Pat. Nos. 3,408,429 and 3,496,254, static casting processes such as in U.S. Pat. No. 5,271,875 and other conventional methods, such as compression molding as disclosed in U.S. Pat. Nos. 4,084,459 and 4,197,266.

Polymerization of the monomer mix may be conducted either in a spinning mold, or a stationary mold corresponding to a desired contact lens shape. The thus-obtained contact lens may be further subjected to a mechanical finishing, as occasion demands. Also, the polymerization may be conducted in an appropriate mold or vessel to give a lens material in the form of button, plate or rod, which may then be processed (e.g., cut or polished via lathe or laser) to give a contact lens having a desired shape.

The hydrogels produced by the present invention are oxygen transporting, hydrolytically stable, biologically inert, and transparent. The monomers and prepolymers employed in accordance with this invention are readily polymerized to form three-dimensional networks which permit the transport of oxygen and are optically clear, strong and hydrophilic.

The present invention provides materials which can be usefully employed for the fabrication of prostheses such as heart valves and intraocular lenses, as optical contact lenses or as films. More particularly, the present invention concerns contact lenses.

The present invention further provides articles of manufacture which can be used for biomedical devices, such as, surgical devices, heart valves, vessel substitutes, intrauterine devices, membranes and other films, diaphragms, surgical implants, blood vessels, artificial ureters, artificial breast tissue and membranes intended to come into contact with body fluid outside of the body, e.g., membranes for kidney dialysis and heart/lung machines and the like, catheters, mouth guards, denture liners, intraocular devices and especially contact lenses.

It is known that blood, for example, is readily and rapidly damaged when it comes into contact with artificial surfaces. The design of a synthetic surface which is antithrombogenic and nonhemolytic to blood is necessary for prostheses and devices used with blood.

Although the teachings of the present invention are preferably applied to soft or foldable contact lenses or like medical devices formed of a foldable or compressible material, the same may also be applied to harder, less flexible, lenses formed of a relatively rigid material such as poly(methyl methacrylate) (PMMA).

The polymerizable monomers with both fluoroether and hydrophilic groups useful in certain embodiments of the present invention may be prepared according to syntheses well known in the art and according to the methods disclosed in the following examples.

EXAMPLES

Example 1

Preparation of Reactive Oligomer Derived from N-Vinylpyrrolidone

To a thoroughly dried 1000-mL round bottom flask equipped with a reflux condenser and Nitrogen inlet was charged with N-vinylpyrrolidone (100 g, 0.8997 mole), 2-mercaptoethanol (12.6 mL or 0.1796 mole), 400 mL anhydrous tetrahydrofuran and Vazo 64 (1.14 gram). The contents were bubbled with nitrogen for about 15 minutes while stirred at room temperature. The contents were then heated to reflux for 48 hours. NMR indicated some vinyl groups still were present. Then 0.5 gram of Vazo-64 was added and the contents were continued to be heated to reflux for an additional 4 days. NMR indicated only a trace amount of vinyl groups remained. The solution was then condensed to 120 mL and then poured into 1200 mL of ether to precipitate the product. The dissolution/precipitation was repeated twice. The final product was a white powder.

The molecular weight of the oligomer product was determined by acid-base titration. It was first allowed to react with an excess amount of phenyl isocyanate, then with excess amount of dibutylamine, both in THF, followed by titrating with standardized 0.1 N hydrochloric acid. The molecular weight as determined was 416. (Theoretical 623)

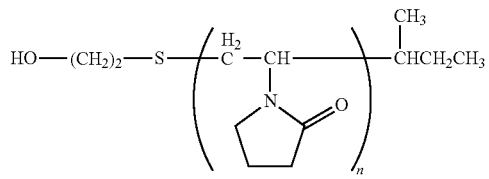

Example 2

Preparation of Reactive Oligomer Derived from N,N-Dimethylacrylamide

To a thoroughly dried 1000-mL round bottom flask equipped with a reflux condenser and Nitrogen inlet was charged with N,N-dimethylacrylamide (140.05 g, mole), 2-mercaptoethanol (19.8 mL or 0.1796 mole), 450 mL anhydrous tetrahydrofuran and Vazo 64 (1.14 gram). The contents were bubbled with nitrogen for about 15 minutes while stirred at room temperature. The contents were then heated to reflux for 48 hours. Infrared spectroscopy indicated no vinyl groups present. The solution was then condensed to 120 mL and then poured into 1200 mL of ether to precipitate the product. The dissolution/precipitation was repeated twice. The final product was a white powder.

The molecular weight of the oligomer product was determined by acid-base titration. It was first allowed to react with an excess amount of isophorone diisocyanate overnight in dichloromethane, then some of product was taken out, added with excess amount of dibutylamine in THF, followed by titrating with standardized 0.1 N hydrochloric acid. The molecular weight as determined was 731.

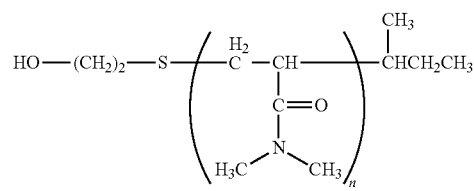

Example 3

Preparation of NVP Oligomer-Terminated Fumarate Prepolymer of Polytetrafluoroethylene Glycol

To a thoroughly dried 500-mL round bottom flask equipped with a reflux condenser, nitrogen inlet is added polytetrafluoroethylene glycol (Mn 2000, 80 grams, 0.0399 mole), fumaryl chloride (15.4 grams, 0.10 moles) and methylene chloride (200 mL). The mixture is heated with an oil bath to reflux under a nitrogen blanket. After two hours, the reaction is complete and the contents stripped under vacuum (5-6 mmHg) for 4 hours. The IR spectrum shows two kinds of peaks for carbonyl groups-both acid chloride and ester. The flask contents is then added with 16.64 g (0.04 mole) of the reactive NVP oligomer and 100 mL of methylene chloride and continued heating the contents under reflux until all acid chloride group disappeared (by IR 1769 cm$^{-1}$) Then the mixture is cooled and 5.41 grams of sodium bicarbonate was added to neutralize the content while kept on stirring overnight. 600 mL of methylene chloride was then added and the solution was filtered and extracted with 100 mL of water. The organic layer is separated and the solvent is stripped to give a viscous fluid product.

Example 4

Preparation of DMA Oligomer-Terminated Fumarate Prepolymer of Polyperfluoroether

This prepolymer is prepared in the same fashion as described in Example 3 using DMA in place of NVP.

Example 5

Monomer Mixes for Lens Casting

A monomer mix derived from the components listed in the following table is prepared.

|  | Parts by Weight |
|---|---|
| $F_2D_{20}$ | 20 |
| TRIS | 40 |
| DMA | 40 |
| n-hexanol | 5 |
| Darocur initiator | 0.5 |
| Tint Agent | 150 ppm |

The following materials are designated above:

| | |
|---|---|
| TRIS | tris(trimethylsiloxy)silylpropyl methacrylate |
| DMA | N,N-dimethylacrylamide |

| | |
|---|---|
| $F_2D_{20}$ | a silicone-containing crosslinking resin as previously described in U.S. Pat. Nos. 5,374,662 and 5,496,871. |

Example 6

Monomer Mix with NVP Oligomer-Terminated Fumarate Prepolymer of Polytetrafluoroethylene Glycol A monomer mix containing the above components at the same parts as those listed in Table 1 is mixed with 0.5 part of NVP oligomer-terminated fumarate prepolymer of polytetrafluoroethylene glycol

Example 7

Lens Casting

The monomer mixture of Example 6 is injected onto a clean polypropylene anterior mold half and covered with the complementary polypropylene posterior mold half. The mold halves were compressed, and the mixture was cured by exposure to UV radiation for 60 minutes The top mold half is removed, and the lenses were maintained in a forced air oven to remove the majority of the n-hexanol diluent. The lenses are removed from the bottom mold half, extracted in isopropanol, and then hydrated in distilled water. They are then placed in borate buffered saline and autoclaved.

Comparative Example 8

Lens Casting

The monomer mixture of Example 6 is injected onto a clean polypropylene anterior mold half and covered with the complementary polypropylene posterior mold half. The mold halves are compressed, and the mixture is cured by exposure to UV radiation for 60 minutes The top mold half is removed, and the lenses are maintained in a forced air oven to remove the majority of the n-hexanol diluent. The lenses are removed from the bottom mold half, extracted in isopropanol, and then hydrated in distilled water. They are then placed in borate buffered saline and autoclaved.

Example 9

Lens Surface Wettability

Lenses of Examples 7 and 8 are compared visually for surface wettability. It is found that lenses cast with NVP oligomer-capped fumarate prepolymer of fluoroether show much better wettability as compared to those without.

Example 10

Surface Characterization of Lenses by XPS

Lenses from Example 7 and 8 are desalinated in polystyrene Petri dish containing HPLC grade water for approximately 15 minutes to remove excess borate saline solution. They are then quartered with clean scalpel and set up on clean sample platens. Three lens posterior and anterior are analyzed per sample. XPS data are collected at Bausch & Lomb's Surface Science laboratory, using a Physics Electronics Quantum 2000 Scanning ESCA Microscope is used for surface characterization. The surface element content (C, N, Si, F) are quantified for each groups of lenses. It is found that, while element content from lenses cast in Example 7 is rich in Si, the element contents of Example 8 indicates that the lens surface can be changed significantly by using the prepolymer of this invention.

Contact lenses manufactured using the unique materials of the present invention are used as customary in the field of ophthalmology. While there is shown and described herein certain specific structures and compositions of the present invention, it will be manifest to those skilled in the art that various modifications may be made without departing from the spirit and scope of the underlying inventive concept and that the same is not limited to particular structures herein shown and described except insofar as indicated by the scope of the appended claims.

What is claimed is:

1. A prepolymer of the following structure:

$$YCO-CH=CHCOXOCCH=CH-COY \quad (I)$$

and $$CH_2=C(CH_2COY)-COXOC(CH_2COY)C=CH_2 \quad (II)$$

wherein Y is a group derived from a reactive oligomer of hydrophilic monomers and X is derived from a reactive fluoroether.

2. The prepolymer of claim 1 wherein Y is a group derived from a reactive oligomer of hydrophilic monomers having the following structure:

$$HZ-CH_2CH_2-S-M_m$$

wherein m is a hydrophilic monomer or comonomer, m is an integer between 2 and 50 and Z is O or NR', and R' is an alkyl group of C1 to C10.

3. The prepolymer of claim 2 wherein the Mn of Y is 500 to 15,000.

4. The prepolymer of claim 2 wherein the Mn of Y is 500 to 1,500.

5. The prepolymer of claim 2 wherein the Mn of Y is 1,000 to 1,500.

6. The prepolymer of claim 2 wherein M is N-vinylpyrrolidone.

7. The prepolymer of claim 2 wherein M is N,N-dimethylacrylamide.

8. The prepolymer of claim 2 wherein X is derived from polytetrafluoroethylene glycol.

9. The prepolymer of claim 2 wherein X is derived from polytetrafluoroethylene glycol and Y is derived from N-vinylpyrrolidone-based hydrophilic oligomer.

10. A polymerizable monomer mixture comprising at least one prepolymer of claim 1.

11. The polymerizable monomer mixture of claim 10 wherein the relative weight % of the prepolymer of claim 1 as compared to the total monomer mix weight % is from about 0.25% to about 10%.

12. The polymerizable monomer mixture of claim 10 wherein the relative weight % of the prepolymer of claim 1 as compared to the total monomer mix weight % is about 0.5% to about 5%.

13. The polymerizable monomer mixture of claim 10 wherein the relative weight % of the prepolymer of claim 1 as compared to the total monomer mix weight % is about 1% to about 2%.

14. The monomer mixture of claim 10 further comprising at least one additional hydrophilic monomer.

15. The monomer mixture of claim 14 wherein the hydrophilic monomer is selected from the group consisting of ethylenically unsaturated lactam-containing monomers, methacrylic acids, acrylic acids, (meth)acrylic substituted alcohols, (meth)acrylamides, vinyl carbonate, vinyl carbamate monomers, oxazolinone monomers, glycerol methacrylate, polyethyleneglycol monomethacrylate and mixtures thereof.

16. The monomer mixture of claim 10 further comprising at least one silicone monomer.

17. The monomer mixture of claim 16 wherein the at least one silicone monomer is a bulky polysiloxanylalkyl (meth)acrylic monomer.

18. The monomer mixture of claim 16 further wherein the at least one silicone monomer is selected from the group consisting of methacryloxypropyl tris(trimethylsiloxy)silane (TRIS), pentamethyldisiloxanylmethylmethacrylate, tris(trimethylsiloxy)methacryloxy propylsilane, phenyltetramethyldisiloxanylethyl acrylate, methylbis(trimethylsiloxy)methacryloxymethyl silane and mixtures thereof.

19. The monomer mixture of claim 10 further comprising a crosslinking agent.

\* \* \* \* \*